Sept. 11, 1951 Q. C. BRIDENBAUGH 2,567,505
FLUID MOTOR
Filed April 26, 1948 3 Sheets-Sheet 1
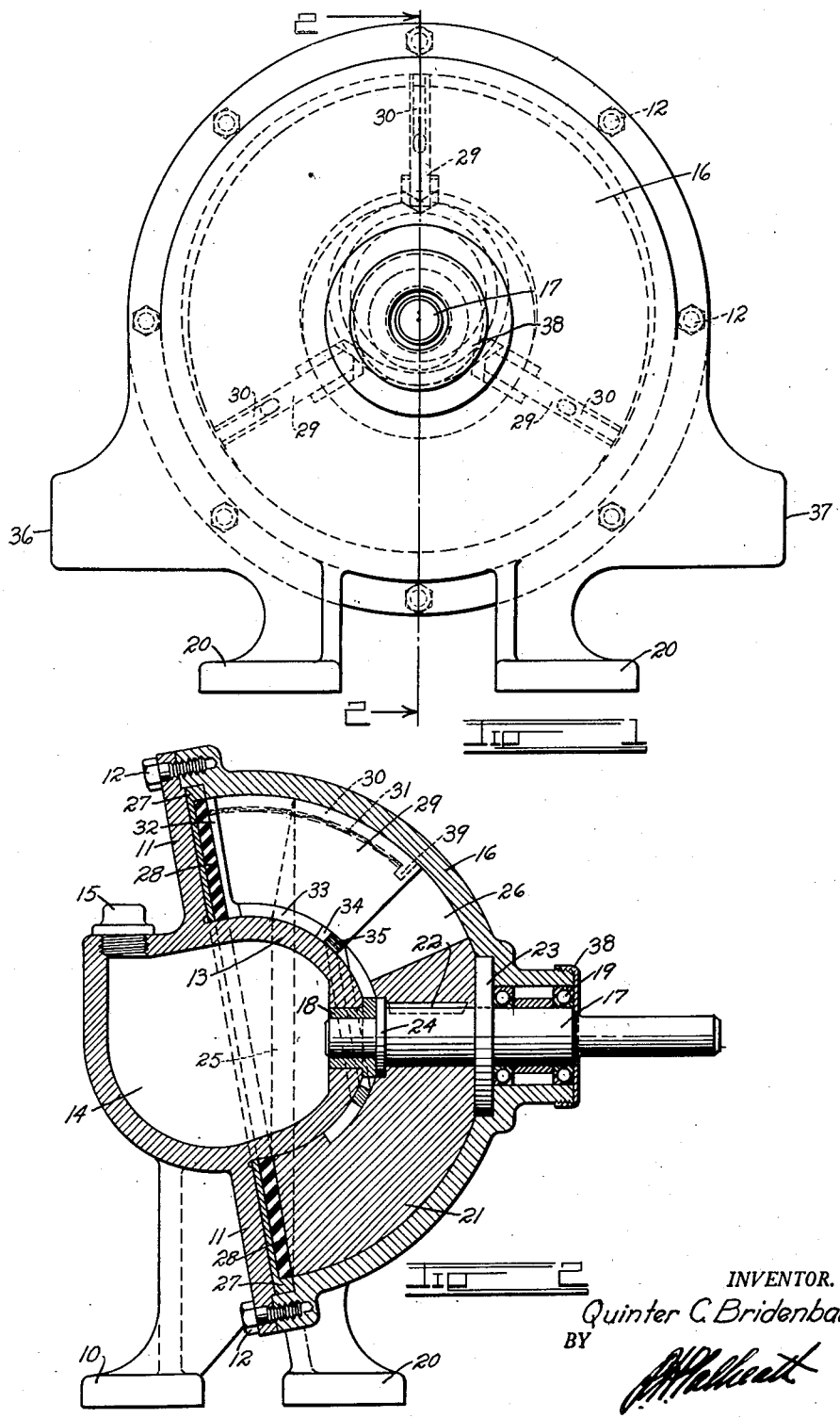
INVENTOR.
Quinter C. Bridenbaugh
BY
ATTORNEY

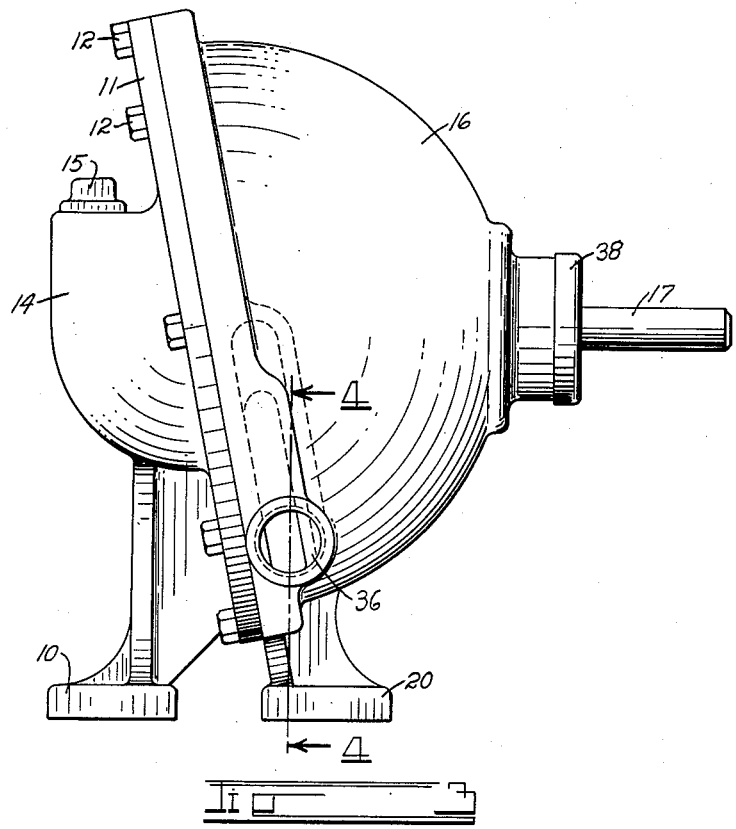
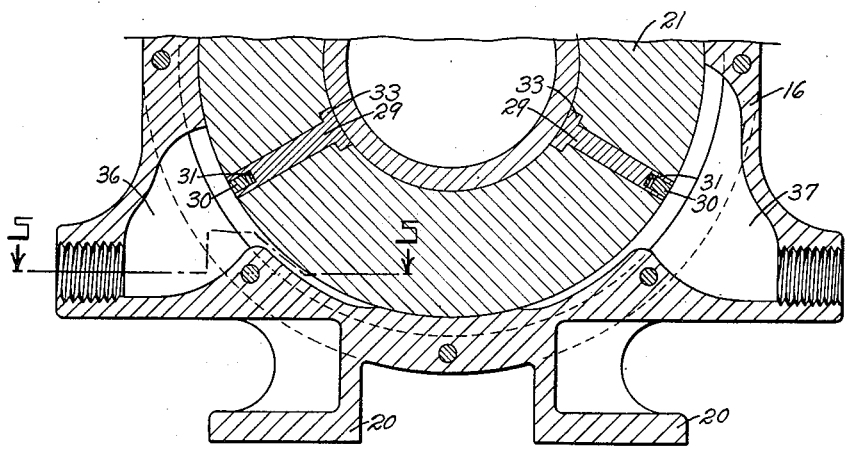

Sept. 11, 1951  Q. C. BRIDENBAUGH  2,567,505
FLUID MOTOR
Filed April 26, 1948  3 Sheets-Sheet 3
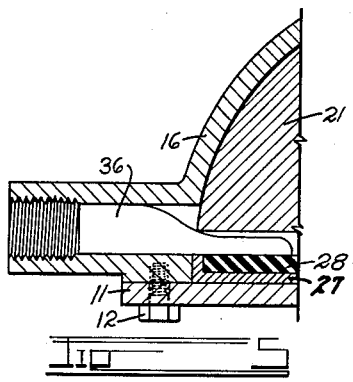
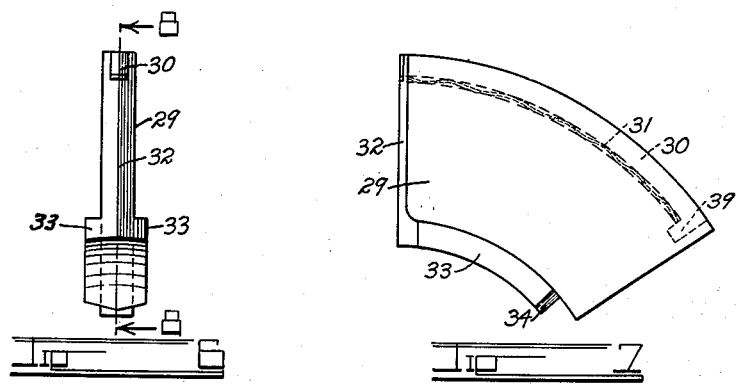
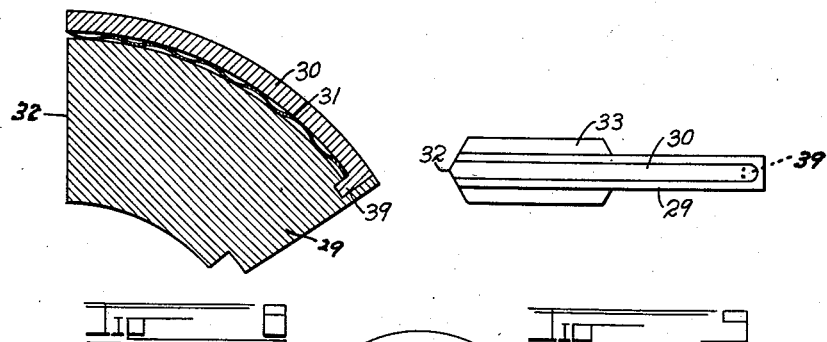
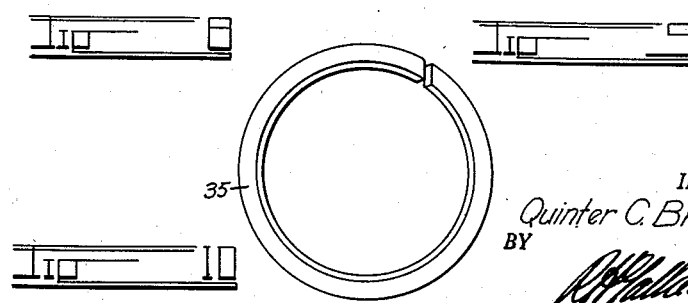
INVENTOR.
Quinter C. Bridenbaugh
BY
ATTORNEY Patented Sept. 11, 1951

2,567,505

UNITED STATES PATENT OFFICE 2,567,505

FLUID MOTOR

Quinter C. Bridenbaugh, Glenwood Springs, Colo.

Application April 26, 1948, Serial No. 23,321

2 Claims. (Cl. 121—69)

This invention relates to a fluid pressure device which may be used either as a motor, pump, or compressor, and has for its principal object the provision of a highly efficient rotary pump or motor, which will operate with a minimum of frictional and leakage losses and with a minimum of moving and wearing parts, and which will produce a continuous torque when used as a motor, and a continuous flow under high pressure when used as a pump or compressor.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side elevation of the improved fluid pressure device;

Fig. 2 is a vertical, longitudinal section therethrough, taken on the line 2—2, Fig. 1;

Fig. 3 is an end view of the device;

Fig. 4 is a fragmentary, detail section, taken on the line 4—4, Fig. 3;

Fig. 5 is a similar detail section, taken on the line 5—5, Fig. 4;

Fig. 6 is an end view of a pressure vane as employed in the fluid pressure device;

Fig. 7 is a side view of the pressure vane of Fig. 6;

Fig. 8 is a longitudinal section through the pressure vane, taken on the line 8—8, Fig. 6;

Fig. 9 is a top view of the pressure vane; and

Fig. 10 is a detail view of a resilient sealing ring employed in the device.

While the invention will operate with equal efficiency as either a motor, pump, or compressor, it will be herein described as a fluid motor.

The improved fluid motor consists of a main casting provided with suitable supporting feet 10 and consisting in the main of an inclined, circular, fixed disc 11 provided with openings around its periphery for the reception of cap screws 12. The center portion of the disc 11 contains a hemispherical boss 13 projecting outwardly from its forward face. The boss 13 is hollow and is closed on the exterior of the disc 11 to form a lubricating oil chamber 14 to which access may be had by means of a screw plug 15.

A hemispherical housing 16 is secured around the periphery of the disc 11 by means of the cap screws 12 to form an annular, hollow, semispherical chamber with a spherical outer wall formed by the housing 16, and a parallel, spherical inner wall formed by the boss 13.

A power shaft 17 is mounted in a suitable bearing bushing 18 in the boss 13 and in anti-friction bearings 19 in the housing 16. The housing 16 is provided with supporting feet 20 which co-act with the feet 10 to support the entire motor.

The axis of the shaft 17 intersects the centers of the disc 11, the spherical boss 13 and the spherical housing 16, and is inclined from the plane of the disc 11. The angle of incline may be any desired amount, preferably approximating 10° from a perpendicular position with reference to the plane of the disc 11. In the preferred construction, the shaft 17 is horizontal, the horizontal diameter of the disc 11 is at right angles to the shaft, and the vertical diameter inclines at 10° from the vertical.

A hollow, cup-like rotor 21 is mounted on the shaft 17 by means of a feather key 22, or in any other desired manner. A sealing washer 23 surrounds the shaft and seals against a flat, forward surface on the rotor 21. The washer 23 is inset in a receiving socket in the housing 16. A retainer flange 24 is formed on the shaft and bears against the rear surface of the rotor 21. The inner extremity of the shaft 17 is reduced in diameter to rotate in the bushing 18 and oil in the chamber 14 lubricates the end of the shaft.

The rotor 21 rotates concentrically about the axis of the shaft 17. The rotor is provided with a frusto-conical surface 25 around its open face inclined on an angle corresponding to the inclined angle of the disc 11. The rotor 21 contains a plurality of radial slots 26. In the embodiment illustrated, three slots are employed. The outer surface of the rotor 21 conforms to, and rides in moving engagement with, the spherical inner surface of the housing 16. The inner surface of the rotor 21 is positioned in uniform, spaced relation to the spherical outer surface of the boss 13.

An annular, rotatable circular plate 27 is positioned against the inner face of the fixed disc 11 and is notched into the periphery of the housing 16 so as to rotate between the rotor 21 and the disc 11. An annular sealing disc 28 of rubber or other suitable nonmetallic material is inset into the plate 27 and forms a smooth front surface thereon. The lower portion of the bevelled surface 25 of the rotor 21 has face to face engagement with the lower portion of the disc 28, but for the remainder of its circumference, the surface 25 extends upwardly in progressively increasing spaced relation to the disc, thereby forming a crescent-shaped space extending circumferentially about the boss 13 and having its arms presented downwardly and tapered towards their lower ends which terminate at opposite sides of the contacting lower portions of the disc and the surface 25 of the rotor.

An arcuate sliding vane 29 is positioned in each of the radial slots 26. Each vane 29 carries an arcuate sealing bar 30 inset in a groove in its outer circumference which is constantly forced against the inner surface of the housing 16 by means of a corrugated leaf spring 31 positioned in the bottom of the bar groove. The forward edge of each vane 29 is inclined back at both sides to form a relatively sharp edge 32 which rides against the sealing disc 28 on the plate 27 tight joints being thus formed along the outer ends of the vanes. Each vane 29 is flanged outwardly at both sides along its smaller arc to form arcuate flanges 33 which slidably fit between the inner concave surface of the rotor and the spherical surface of the boss 13. The flanges terminate in a pointed shoulder 34 inset from the extremity of the vane. An expanding ring 35 is movably mounted between the rotor 21 and the boss 13. This ring resiliently expands against the pointed shoulders 34 of the vanes to constantly force the latter outward against the annular sealing disc 28.

The housing is provided with an inlet passage 36 and an exhaust passage 37 which may be internally threaded to receive lengths of pipe, or arranged in any other way for connection to pipe or tubing.

Let us assume that fluid pressure is entering the intake passage 36. The fluid cannot pass between the rotor 21 and the sealing ring 28 at the bottom, as the latter two members are in tight contact. It therefore rises against the adjacent vane 29 and forces the latter upwardly until the next vane passes the inlet, when the process is repeated. As each vane reaches the top, the preceding vane will have passed the exhaust passage, so that the fluid preceding the vane will be forced through the exhaust passage. As the vanes pass the top, they begin to recede into the rotor 21, due to the incline of the fixed disc 11 so as to gradually decrease the size of the intervening chambers to force the fluid under pressure from the exhaust passage 37.

It will be noted that as the vanes approach the bottom, they move into the rotor, and in so doing they push the expanding ring inwardly. This causes the latter ring to exert pressure outwardly against the shoulders 34 on the remaining vanes, forcing the latter outwardly into sealing contact with the sealing ring 28.

While a specific form of the improvement has been described and illustrated herein, it is desired to be understood that the same may be varied, within the scope of the appended claims, without departing from the spirit of the invention.

Having thus described the invention what is claimed and desired secured by Letters Patent is:

1. A fluid pressure motor comprising a fixed circular disc disposed vertically at an incline, a hollow boss disposed centrally through said disc and having a hemispherical portion projecting forwardly from the disc and rearwardly of the disc being formed with a filling opening normally closed by a removable closure, said hollow boss forming a lubricant container adapted to be filled with oil through the filling opening, a bearing mounted through the center of the hemispherical portion of said boss, a hemispherical housing secured about its margin to the margin of said disc and defining a hemispherical chamber, said housing being provided with a bearing disposed opposite the bearing of the boss in alignment therewith, a horizontal shaft rotatably mounted through the bearings with a portion passing through said chamber and having its inner end exposed in the lubricant container and lubricated by the oil in said container, a concavo-convex hemispherical rotor in said chamber secured about and turning with said shaft and having an annular edge face disposed diagonally of said disc and together therewith forming a crescent-shaped space between the rotor and the disc, a sealing ring surrounding the bearing carried by said boss, and blades slidably mounted in slots formed in said rotor radially thereof and moving longitudinally in the slots across the crescent-shaped space during rotation of the shaft on the rotor and having portions engaging said sealing ring.

2. A fluid pressure motor comprising a fixed disc disposed vertically at an incline, a hemispherical boss projecting forwardly from said disc centrally thereof, a hemispherical housing secured about its margin to said disc and defining a hemispherical chamber, a horizontal shaft having a portion passing through said chamber, aligned bearings carried by the boss and the housing and in which the shaft is rotatably mounted, a concavo-convex rotor in said chamber secured to and turning with the shaft and having close fitting face to face engagement with said boss and the inner surface of said housing, said rotor having an annular edge face disposed diagonally of the disc and together therewith forming a crescent-shaped space between the disc and the rotor, said rotor being formed with radially extending slots leading from its edge face and with recesses along opposite sides of the inner edge of each slot, blades slidable longitudinally in said slots and having movement across said space during the rotation of the rotor, said blades having laterally extending flanges along their inner side edges fitting into said recesses and slidable longitudinally therein, and sealing strips extending along the outer side edges of the blades and being urged upwardly into close fitting contact with the inner surface of said housing.

QUINTER C. BRIDENBAUGH.

REFERENCES CITED

The following references are of record in the file of this patent:

UNITED STATES PATENTS

| Number | Name | Date |
|---|---|---|
| 595,745 | Taber | Dec. 21, 1897 |
| 958,408 | Kadow | May 17, 1910 |
| 1,566,355 | Sunnes | Dec. 22, 1925 |
| 1,992,374 | Kempthorne | Feb. 26, 1935 |
| 2,244,539 | Krueger | June 3, 1941 |
| 2,401,376 | Sherman | June 4, 1946 |

FOREIGN PATENTS

| Number | Country | Date |
|---|---|---|
| 3,814 | Great Britain | Mar. 24, 1885 |